United States Patent [19]

Blancas

[11] Patent Number: 4,653,613
[45] Date of Patent: Mar. 31, 1987

[54] ROTATING GRIP BRAKE FOR BICYCLES

[76] Inventor: Rueben Blancas, 1273 W. 5100 South, Riverdale, Utah 84403

[21] Appl. No.: 803,169

[22] Filed: Dec. 2, 1985

[51] Int. Cl.⁴ .......................... B62L 1/00; B62L 3/00
[52] U.S. Cl. .................................. 188/24.11; 74/489; 188/24.18; 188/24.22; 188/2 D
[58] Field of Search .......................... 188/24.11–24.22, 188/25, 26, 27, 106 P, 106 R, 105, 2 D; 280/264; 74/489, 501, 506, 504

[56] References Cited

U.S. PATENT DOCUMENTS

| | | | |
|---|---|---|---|
| 561,007 | 5/1896 | Little | 74/489 X |
| 2,271,273 | 1/1942 | Mueller | 188/24.11 X |
| 2,874,587 | 2/1959 | Schmid | 74/489 |
| 3,554,329 | 1/1971 | Shimano | 188/24.18 |
| 3,567,250 | 3/1971 | Wolf | 188/24.18 X |
| 3,759,352 | 9/1973 | Toplis | 74/489 X |
| 3,760,648 | 9/1973 | Hoffman | 188/24.11 X |
| 3,948,361 | 4/1976 | Carlson | 188/24.18 |
| 4,018,449 | 4/1977 | Anderson | 188/2 D X |
| 4,019,402 | 4/1977 | Leonheart | 74/489 |
| 4,026,165 | 5/1977 | Papp | 280/264 X |
| 4,057,127 | 11/1977 | Woodring | 188/24.16 |
| 4,232,565 | 11/1980 | Leonheart | 74/501 X |

FOREIGN PATENT DOCUMENTS 0999833  2/1952  France .............................. 188/24.11

*Primary Examiner*—Douglas C. Butler
*Attorney, Agent, or Firm*—A. Ray Osburn

[57] ABSTRACT

A rotation actuated internal lever braking system for bicycles. Braking is applied by rotation of a handle bar grip through a lever system to pull flexible cables operating friction brakes at one or both wheels. A pair of cable pulling units may be provided, each individually controlling a brake on the front or rear wheel. If desired, cables to both wheel brakes may be actuated by a single unit. The units may be designed for selective self locking or self releasing when placed in braking position.

12 Claims, 13 Drawing Figures

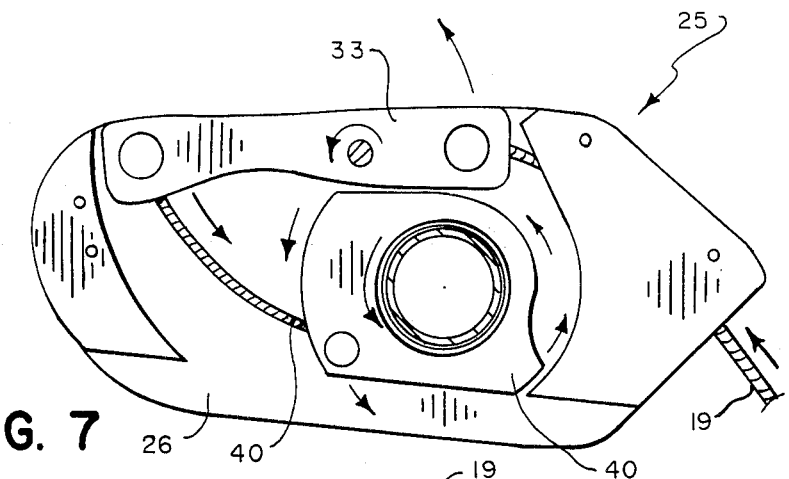
FIG. 7
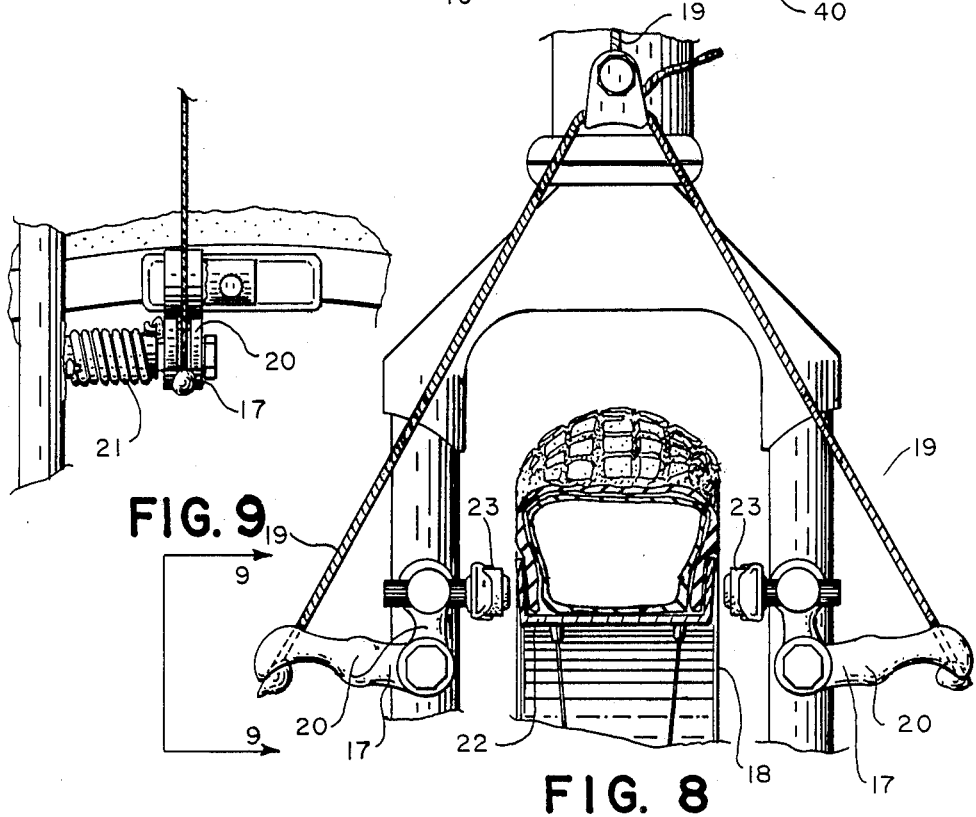
FIG. 9
FIG. 8
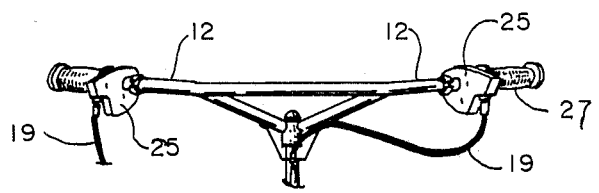
FIG. 10

ROTATING GRIP BRAKE FOR BICYCLES

BACKGROUND OF THE INVENTION

1. Field

The field of the invention is hand operable braking systems for bicycles.

2. State of the Art

The first braking system for pedal operated bicycles in general use was the foot operated coaster brake incorporated into the rear wheel hub. Backward rotation of the pedals actuates a ratchet mechanism attached to the chain sprocket at the hub, forcing axle and hub-mounted braking disks frictionally together. The more recent multi-gear derailleur systems include at least two rear wheel sprockets of different sizes, the chain being moved from one to the other to change gears. Requiring much chain slack to accommodate the varying diameter sprockets, the derailleur systems effectively eliminated the use of the coaster brake. Rim gripping brake mechanisms came into use, operated by flexible cables, not by the feet but by the hands of the bicycle rider at the handle bars. The flexible cables are attached to handle bar mounted levers, and extend through flexible sheath housings to the wheel brakes. The grip of the hands upon the handle bar must be shifted to operate the brake levers, resulting in substantial loss of steering control. Notwithstanding, such lever operated systems are widely used and work reasonably well for standard road bikes on gentle grades. For such use, bicycles respond readily to relatively gentle forces upon the handle bars, which accordingly have rearwardly extending comfortably grasped hand grips. The shortcomings are, however, much more serious for mountain bicycles, used upon extremely precipitous, often unpaved courses. Mountain bikes, and the similar BMX's, must be often forceably manipulated, and hand grips extend sidewards to provide the needed tenacious grip. Still, the rider must virtually relinquish his grip upon the handle bars to grasp and operate the braking levers. Often he cannot do so without losing control of the bicycle. Spills and injuries are accordingly common. Until now, an unfulfilled need has existed for a braking system for such bicycles which can be applied without severely impairing the rider's control of the handle bars.

BRIEF SUMMARY OF THE INVENTION

With the foregoing in mind, the present invention eliminates or substantially alleviates the shortcomings of prior art cable operated bicycle braking systems, by providing a system operated by manual rotation of handle bar grip assemblies without any change of the rider's firm, controlling grasp. A cable pulling lever and a grip assembly are each secured to one of the handle bars of the bicycle, the lever pivotally upon and the grip rotatably about the handle bar. Lever and grip assembly are mechanically connected so that rotary motion of the hand grip operates the lever to translate an end of a flexible cable connecting the lever with a wheel braking device. In the preferred embodiment, the cable-pulling lever is pivotally secured to a base member clamped to one of the handle bars. The hand grip assembly is tubular and is installed about the hand bar. The grip is connected to the cable-pulling lever by a radially extending crank arm and an end pivoted rigid linkage. Manual rotation of the grip operates the lever to pull the connecting cable along its axis to operate the braking device provided at the bicycle wheel. The wheel brake is state-of-the-art, comprising, e.g., a pair of levers mounted to the bicycle frame which are forceably turned against spring resistance by pull of the cable to grip the rim of the wheel between a pair of friction pads.

With one aspect of the invention, a separate cable-pulling unit may be provided on both of the handle bars, and used to brake front and rear wheels separately using separate hands. However, a suitably adapted single cable-pulling unit may be made to serve both wheels. In this case, cables from both front and rear wheel braking devices are attached to the cable-pulling lever of the unit. With this variation of the rotating grip brake, rotation of the handle bar grip then actuates both cables and brakes both wheels simultaneously, and only one hand is used. With either version, the lever, linkage and crank arm combination may be selected to provide for locking the brake in full braking position. Also with either version, and with or without the locking feature, the bicycle is braked, with one or two hands, without relinquishment or relaxation of firm controlling grasp of the handle bar grips. It is accordingly the principal object of the invention to provide a bicycle braking system operable without compromise of secure, safe control of the bicycle.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
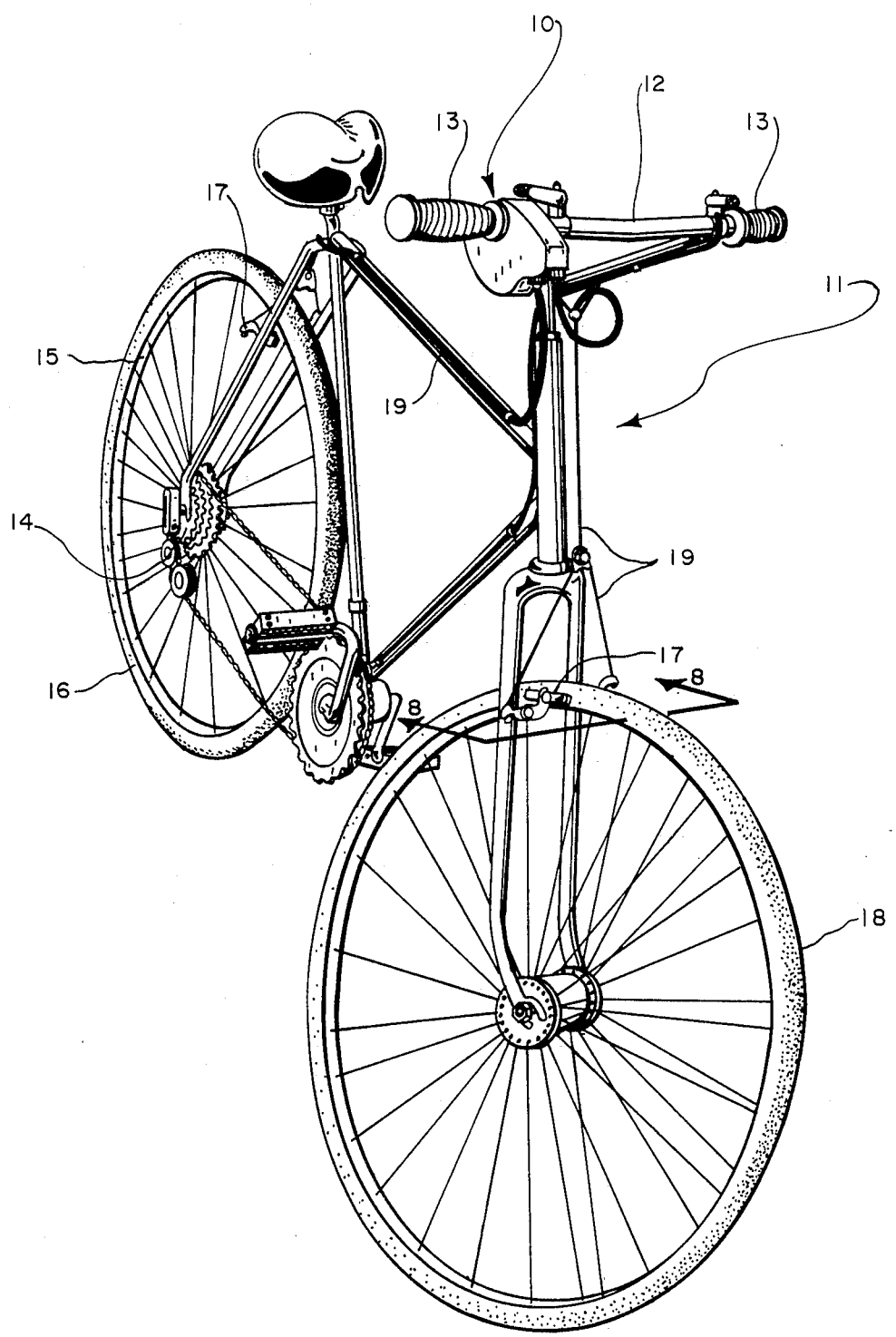
FIG. 1 is a perspective representation of a rotating grip, internal lever, brake system for bicycles in accordance with the invention, shown installed upon a representative bicycle, drawn to a reduced scale, FIG. 2 an elevation view of a cable pulling unit of the brake system of FIG. 1, drawn to substantially full scale, FIG. 3 a cross sectional view of the cable pulling unit of FIG. 2, taken along line 3—3 thereof, drawn to the scale of FIG. 2, the rotating grip being positioned in the non-braking position, FIG. 4 a vertical cross sectional view of the cable pulling unit of FIG. 2, taken along line 4—4 thereof, drawn to the scale of FIG. 2, the rotating grip being shown in braking position, FIG. 5 a vertical cross sectional view of the cable pulling unit of FIG. 4, taken along line 5—5 thereof, drawn to the same scale, FIG. 6 a vertical cross sectional view of the cable pulling unit of FIG. 4, taken along line 6—6 thereof, drawn to the same scale, FIG. 7 a cross sectional view of another embodiment of a cable pulling unit 25 designed to incorporate a flexible linking member, drawn to substantially full scale, FIG. 8 a cutaway view of a fragment of the bicycle of FIG. 1, taken along line 8—8 thereof, drawn to substantially full scale, FIG. 9 a side elevation view of the fragment of FIG. 8, taken along 9—9 thereof, drawn to the same scale, FIG. 10 an elevation view of a fragment of the bicycle of FIG. 1, illustrating the use of a pair of cable actuating units, drawn the approximate scale of FIG. 1, FIG. 11 a vertical cross sectional view of the cable pulling unit of FIG. 2, taken along line 11—11 thereof, and drawn to the same scale, cable pulling lever, linking member and crank arm being shown in the position providing maximum cable pulling force, FIG. 12 a vertical cross sectional view of the cable pulling unit of FIG. 2, taken along line 12—12 thereof, and drawn to the same scale, with the cable pulling lever, linking member and crank arm proportioned and positioned to lock in full braking position, and FIG. 13 a horizontal sectional view of a cable pulling unit in accordance with the invention, showing a rotating sheave to guide a flexible cable to connect with the cable pulling lever, drawn to substantially full scale.
Figure 2:
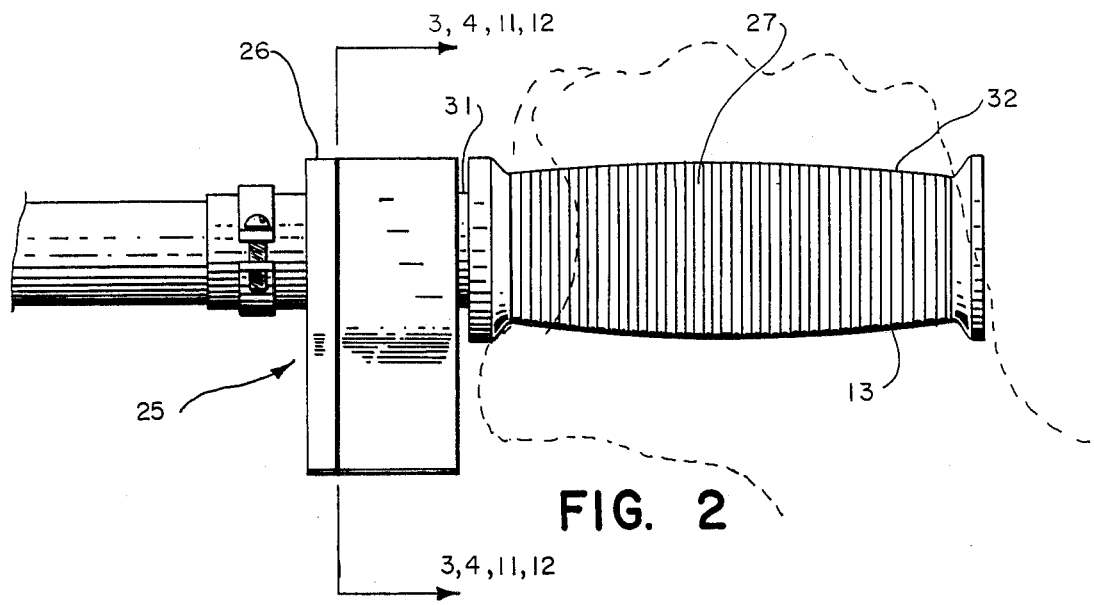
Figure 3:
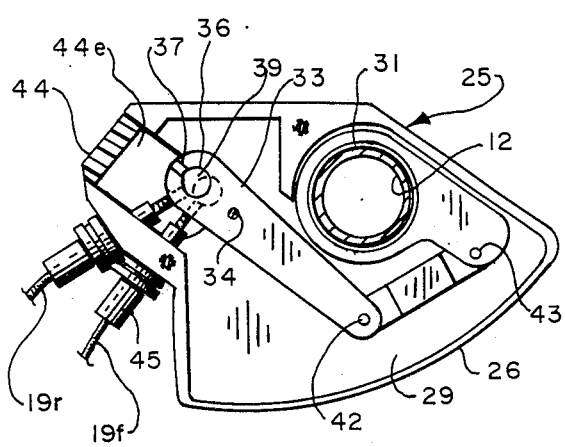
Figure 4:
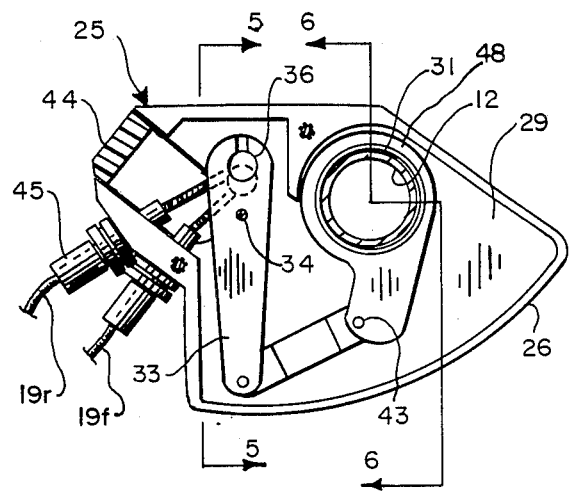
Figure 5:
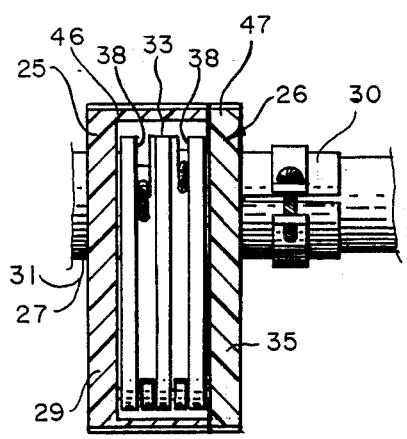
Figure 6:
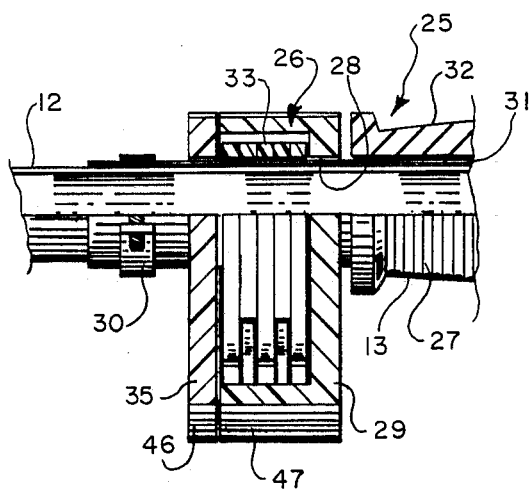

A rotation actuated, internal lever, bicycle brake system 10 is shown in FIG. 1 installed upon a bicycle 11. Designed for steep roads, bicycle 11 may be of the type commonly called a "mountain bike", or a "BMX" (Bicycle Moto Cross). The substantially straight, sidewardly directed handle bars 12 enable the rider to firmly grip and forcefully tug and wrench upon hand grips 13 to control the bicycle. A multi-sprocket gear assembly 14 at the hub or rear wheel 15, along with a slack-compensating derailleur chain shift mechanism 16, provides the high range of gear ratios needed for mountain grades.

A wheel brake assembly 17 is provided for rear wheel 15 and front wheel 18, each actuated by a branching flexible cable 19 from one of the handle bars 12. At each wheel, a pair of pivotally mounted braking members 20 must be rotated against the resistance of a torsion spring 21 to grip rim 22 between friction shoes 23. (FIGS. 8 and 9)

The brake system 10 of FIG. 1 includes the wheel brakes 17, the flexible actuating cables 19, and a single rotation actuated cable pulling unit 25. Unit 25 is used in place of two prior art lever assemblies, not shown, and serves to actuate both cables 19. However, brake system 10 may, if desired, be varied to utilize two separate cable pulling units 25, one to serve each of the front and rear brake cables 19. (FIG. 10)

Whether adapted for two cables 19 or only one, unit 25 comprises a cable pulling system of levers and linkages installed inside a housing 26. Unit 25 is operated by the rider by turning a gripping assembly 27 fastened rotatably to housing 26 through a bore 28 in housing rear wall 29. An open-ended tubular mounting clamp 30 secures cable pulling unit 25 to handle bar 12, which extends through clamp 30, housing 26 and grip tube 31 with non-slip gripping sheath 32. (FIGS. 2–6)

Inside housing 26 is a cable pulling lever 33 fulcrumed about a pin 34 mounted into housing front wall 35 and rear wall 29. Lever 33 has a cable holding bore 36 with communicating installation slots 37 and 38 for attachment of cable 19 using end block 39. The rider works lever 33 by turning grip assembly 27 a fraction of a revolution, grip tube 31 turning around handle bar 12 and within housing rear wall bore 28. Fixedly attached crank arm 40 acts through a compressive link 41. Link 41 is secured to arm 40 and cable lever 33 through link pivot pins 42 and 43. Access for cable installation and removal is provided by means of a removable cap 44 with downwardly directed ear 44e. A cable tension modifying assembly 45 provides fine adjustment. Housing 26 may have separable, screw connected portions 46 and 47 to facilitate access to internal components. (FIGS. 3–6)

Figure 11:
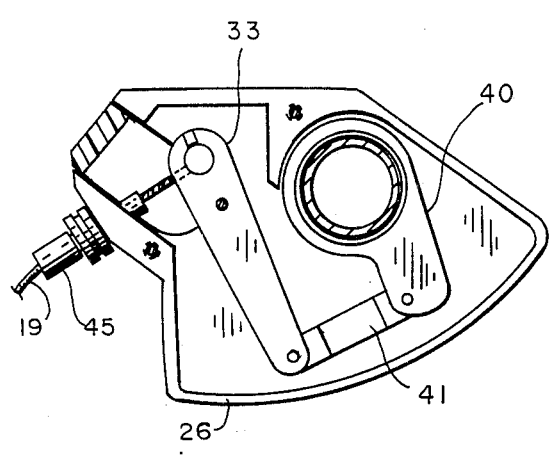

Preferably, cable actuating unit 25 is designed for rearward and downward motion of the top of the hand to provide comfortable control. Preferably, about one-eighth of a revolution of grip 27 suffices for full braking, including taking up of any slack in cable 19 and brake 17. Prior to braking, cable lever 33 is urged against collar 48 of crank arm 40 by tension in cable 19 from wheel brake torsion spring 21. (FIGS. 3, 9 and 10) Grip 27 is turned against this tension until brake shoes 23 contact rim 22. Advantageously, cable lever 33, link 41 and crank arm 40 are situated at this time to produce maximum mechanical advantage. This provides maximum braking force upon rim 22. (FIG. 11) Cable 19 is perpendicular to cable lever 33, as is linkage 41 which is also perpendicular to line 49 through center of rotation 50 of grip tube 31 and pivot pin 43.

For braking both front and rear wheels with a single hand, lever 33 is provided with two sets of cable connecting bores 36 and slots 38 and 39, as necessary to accommodate two cables 19. (FIGS. 3 and 4) Since braking of front wheel 18 alone may lead to loss of control of the bicycle, the front wheel cable 19f is connected to lever 33 more closely to pivot pin 34 than is the rear wheel cable 19r. This relative position of cable connecting points assures that rear wheel 15 will at any moment be braked more severely than will front wheel 18.

When individual manual control of front and rear wheel brakes is desired, separate units 25 are provided for left and right handle bars 12. (FIG. 10) Each is used to actuate a cable 19 to one of the wheels. Preferably, both actuators 25 are designed for rearward and downward rotation of the top of grip 27 when braking.

Figure 12:
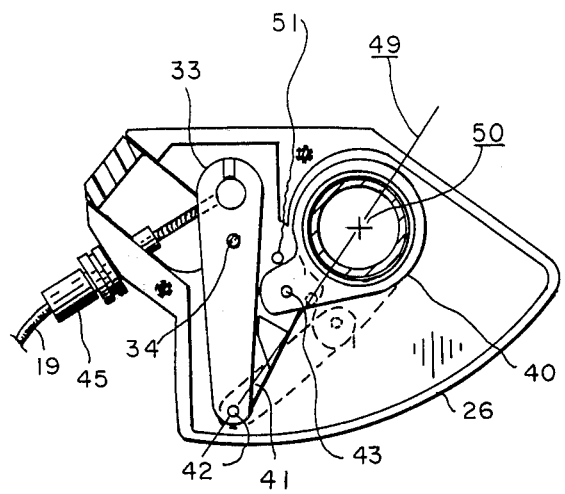

Unit 25 may, if desired for stunt riding e.g., be designed to lock brake 17 to immobilize rear wheel 15. To accomplish this, location of cable lever pin 34 must be particularly selected, along with the effective lengths of arm 40, lever 33 and link 41. That is, when the latter components are in full braking position, pin 43 must have moved slightly past a line 49 through pin 42 and the center of rotation 52 of grip tube 31. (FIG. 12) The tension in cable 19 from brake spring 21 acts through lever 33 and link 41 to hold crank arm 40 urged against a stop 51. This holds grip 27 in braking position until manually released by backward rotation. It is noted that selectivity of the locking feature can be easily provided in several ways. E.g. stop 51 may be provided in the form of a pin selectively placed in bores in housing 26 to permit or prevent rotation of grip assembly 27 into locking position. See dashed lines, FIG. 12, showing stop 51 placed to prevent rotation of grip 13 into locking position. Or, pivot pin 43 may be selectively placed in one or the other of a pair of spaced apart bores in crank arm 40, not shown, to provide either a locking or a non-locking feature to actuator 25.

Figure 13:
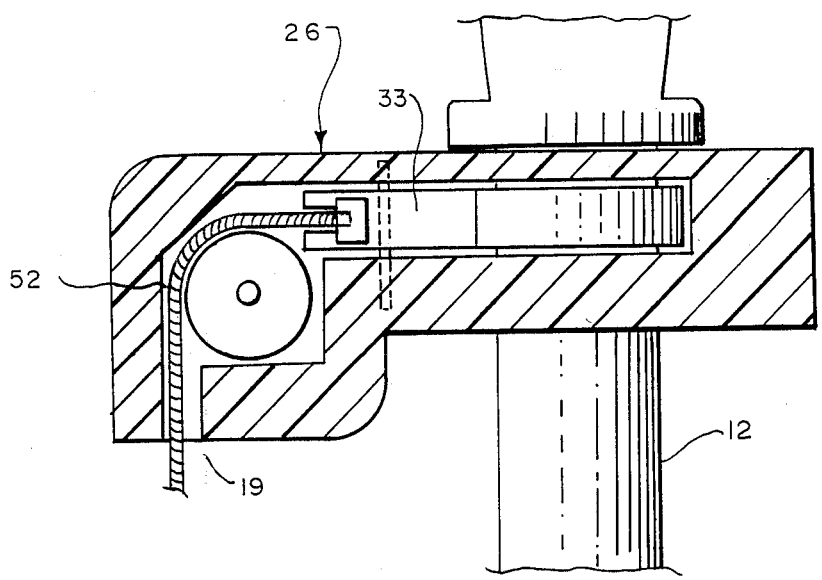

If desired, a large diameter, cable-directing sheave 52 may be provided in housing 26 suitably adapted as shown in FIG. 13. With sheave 52, cable 19 must bend through about 90° when attached to cable pulling lever 33. With sheave 52, cable 19 extends sideways to unit 25, so that the prior art cable mounting can be utilized without change.

The illustrated embodiments of rotation actuated brake system 10 may be varied considerably without departing from the spirit of the invention. For example, the enclosing housing 26, although very desirable, could be openly constructed. Any type of cable operated wheel friction brake could be incorporated into the brake system. Also, actuator 25 could in one embodiment provide for connection of cable 19 directly to crank arm 40, eliminating linkage 41 and lever 33, if sufficient cable force could be provided with the particular wheel braking device. A flexible tension link 40 could be utilized in cable pulling unit 25, albeit with some design difficulty because lever 33 tends to obstruct the gear shift lever which is also adjacent to the hand grip 27. (FIG. 7)

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. For a bicycle having a forward and rearward wheel, a frame upon which the wheels are rotatably mounted, and a pair of handle bars, the braking system comprising:
    a flexible cable operable braking device for at least one of the wheels;
    a flexible cable connected to the braking device and extending therefrom to the vicinity of one of the handle bars;
    a base member fixedly secured to the handle bars;
    cable guiding means attached to the bicycle, so that motion imparted to the end of the flexible cable in the direction of its axis at the handle bar produces substantially similar motion of the end of the cable connected to the braking device;
    at least one elongate handle bar grip having means for its mounting rotatably upon the handle bar coaxially therewith and rotatably thereabout;
    means joining the end of the flexible cable to the handle bar grip, so that the wheel braking device may be operated by manual rotation of the grip, said joining means including;
    a cable pulling lever including means pivotally securing it to the base member and having flexible cable connecting means at one of its ends;
    a crank arm affixed to the rotatable grip and extending radially therefrom; and
    a linking member pivotally secured at one of its ends to the end of the cable pulling lever opposite the cable connecting end thereof and at its other end to the end of the crank arm distal from the grip.

2. The bicycle braking system of claim 1, wherein: the linking member connecting the cable pulling lever and crank arm is rigid.

3. The bicycle braking system of claim 1, wherein the linking member connecting the cable pulling lever and the crank arm is flexible.

4. The bicycle braking system of claim 1, wherein: the flexible cable connecting means of the cable pulling lever is adapted for connection of a pair of cables thereto, so that both wheels of the bicycle may be braked by rotation of a single grip.

5. The bicycle braking system of claim 4, wherein: the cable from the rear wheel is connected more distantly from the pivotal connection of the cable pulling lever than is the cable from the front wheel, so that the rear wheel is always braked more severely than the front wheel when the handle bar grip is rotated in the braking direction.

6. The bicycle braking system of claim 1, wherein: the wheel braking device includes spring means urging said device and the connecting cable away from braking position; and
    the relative lengths of the cable pulling lever, linking member and crank arm, and the location upon the base member of the pivotal lever securing means are selected so that the grip is urged rotatably away from braking position by said spring means.

7. The bicycle braking system of claim 1, wherein: the wheel braking device includes spring means urging said device and the connecting cable away from braking position; and
    the relative lengths of the cable pulling lever, linking member and crank arm, and the location upon the base member of the pivotal lever securing means, are selected so that the grip when rotated into full braking position is urged by the spring means towards said full braking position, so that the brake is locked in braking position until the grip is manually rotated oppositely to braking direction.

8. The bicycle braking system of claim 7, further comprising:
    mechanical means limiting the rotation of the grip in the braking direction.

9. The bicycle braking system of claim 8, wherein: the grip rotation limiting means prevents rotation of the grip into brake locking position.

10. The bicycle braking system of claim 8, wherein: the grip rotation limiting means permits rotation of the grip into brake locking position.

11. The bicycle braking system of claim 7, further comprising:
    a sheave rotatably secured to the base, disposed to guide the flexible cable to connect to the cable pulling lever.

12. The bicycle braking system of claim 1, further comprising:
    a sheave rotatably secured to the base, disposed to guide the flexible cable to connect to the cable pulling lever.

* * * * *